(12) United States Patent
Gao et al.

(10) Patent No.: US 9,266,440 B2
(45) Date of Patent: Feb. 23, 2016

(54) ROBOTICALLY OPERATED VEHICLE CHARGING STATION

(75) Inventors: Dalong Gao, Rochester, MI (US); Neil David McKay, Chelsea, MI (US); Matthew J Reiland, Mequon, WI (US); Simon Foucault, Quebec (CA); Marc-Antoine LaCasse, Quebec (CA); Thierry Laliberte, Quebec (CA); Boris Mayer-St-Onge, Quebec (CA); Alexandre Lecours, Quebec (CA); Clement Gosselin, Quebec (CA); David E. Milburn, Highland, MI (US); Linda Y. Harkenrider, Shelby Township, MI (US)

(73) Assignees: GM Global Technology Operations LLC, Detroit, MI (US); Universite Laval, Quebec (CA)

( * ) Notice: Subject to any disclaimer, the term of this patent is extended or adjusted under 35 U.S.C. 154(b) by 538 days.

(21) Appl. No.: 13/484,345

(22) Filed: May 31, 2012

(65) Prior Publication Data

US 2013/0076902 A1 Mar. 28, 2013

Related U.S. Application Data

(60) Provisional application No. 61/539,241, filed on Sep. 26, 2011, provisional application No. 61/539,249, filed on Sep. 26, 2011.

(51) Int. Cl.
*H02J 7/00* (2006.01)
*B65B 3/04* (2006.01)
(Continued)

(52) U.S. Cl.
CPC .............. *B60L 11/1818* (2013.01); *B25J 9/042* (2013.01); *B25J 13/085* (2013.01); *B60L 11/1825* (2013.01); *B60L 11/1827* (2013.01); *H01R 13/6683* (2013.01); *B60L 2230/22* (2013.01); *H01R 13/635* (2013.01); *H01R 13/6315* (2013.01); *H01R 43/26* (2013.01); *H02J 7/0027* (2013.01); *Y02T 10/7005* (2013.01);
(Continued)

(58) Field of Classification Search
CPC .......... B25J 11/00; B25J 13/085; B25J 9/042; B60L 11/18; B60S 5/00; H01R 13/6683; H01R 43/26; H02J 7/00
USPC .......... 348/148, E07.085; 320/109, 137, 149; 901/2, 15, 47
See application file for complete search history.

(56) References Cited

U.S. PATENT DOCUMENTS 5,184,861 A * 2/1993 Voellmer ................... 294/119.1
5,306,999 A 4/1994 Hoffman
(Continued)

FOREIGN PATENT DOCUMENTS

| CN | 201142434 Y | 10/2008 |
| CN | 101745919 A | 6/2010 |
| JP | 2000092622 A | 3/2000 |

*Primary Examiner* — Sath V Perungavoor
*Assistant Examiner* — Patricia I Young
(74) *Attorney, Agent, or Firm* — Quinn Law Group, PLLC

(57) ABSTRACT

A robotic charging station for charging a battery of an electric vehicle includes a base plate, a riser coupled with the base plate and extending substantially transverse to the base plate, and a robotic arm. The robotic arm extends from the riser and supports an end effector. The end effector includes a plurality of electrical contacts configured to couple with a receptacle disposed on the electric vehicle. The robotic arm is configured to move the end effector in three degrees of motion.

9 Claims, 9 Drawing Sheets

(51) Int. Cl.
    *B25J 5/00*     (2006.01)
    *B25J 15/08*     (2006.01)
    *G05B 19/19*     (2006.01)
    *B60L 11/18*     (2006.01)
    *B25J 9/04*     (2006.01)
    *B25J 13/08*     (2006.01)
    *H01R 13/66*     (2006.01)
    *H01R 43/26*     (2006.01)
    *H01R 13/631*     (2006.01)
    *H01R 13/635*     (2006.01)

(52) U.S. Cl.
    CPC .......... *Y02T10/7055* (2013.01); *Y02T 10/7088* (2013.01); *Y02T 90/121* (2013.01); *Y02T 90/125* (2013.01); *Y02T 90/128* (2013.01); *Y02T 90/14* (2013.01)

(56) References Cited

U.S. PATENT DOCUMENTS

| | | | | |
|---|---|---|---|---|
| 5,355,063 | A | * | 10/1994 | Boone et al. ............. 318/568.11 |
| 6,157,162 | A | * | 12/2000 | Hayashi et al. ................ 320/104 |
| 2003/0164200 | A1 | * | 9/2003 | Czeranna et al. ................. 141/1 |
| 2008/0255703 | A1 | * | 10/2008 | Wang et al. ................... 700/245 |

* cited by examiner

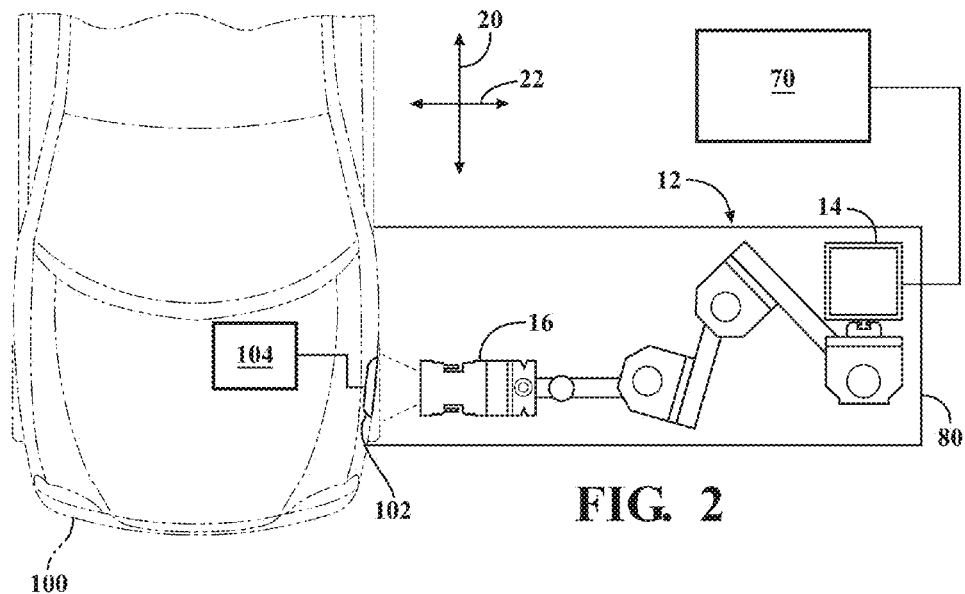
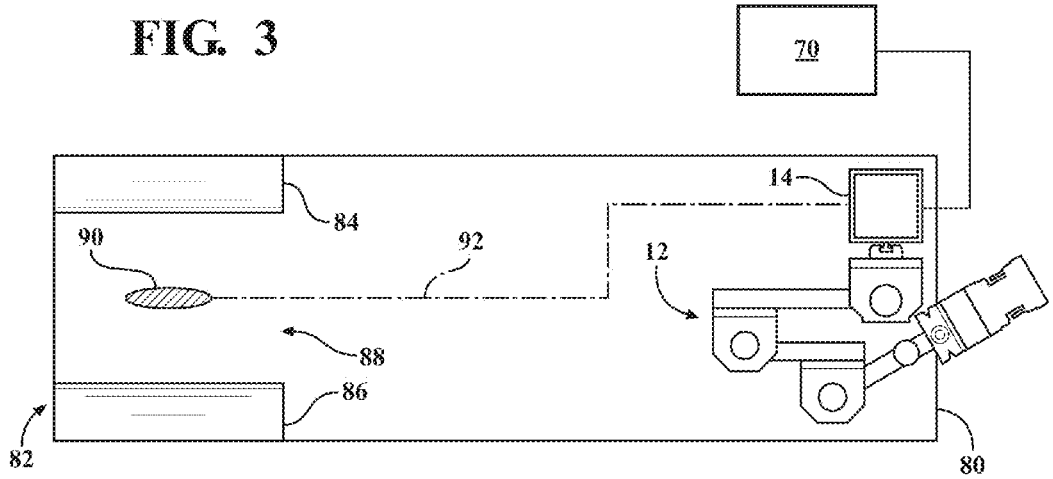

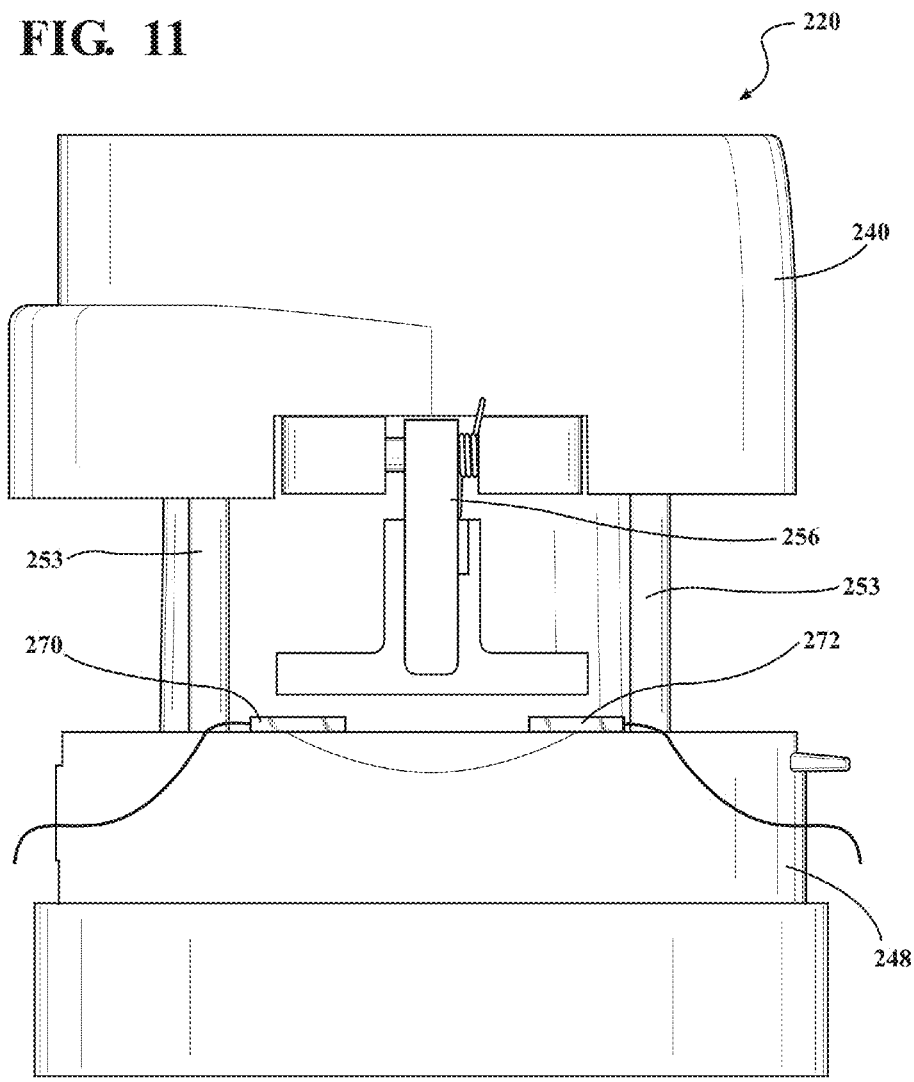

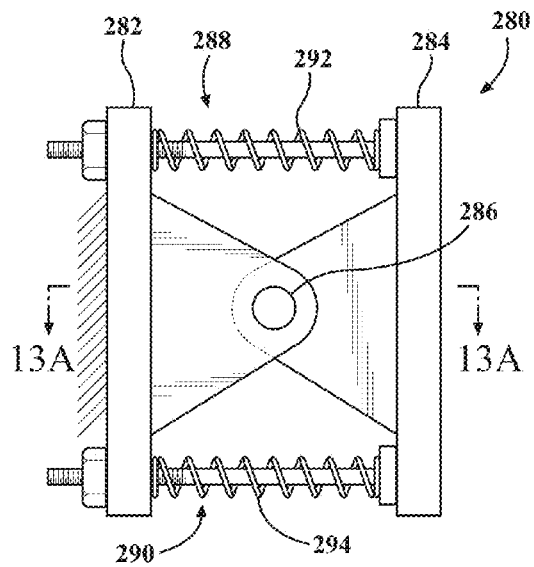
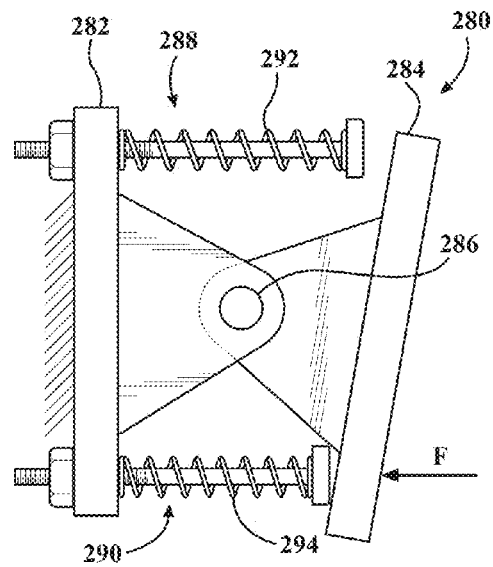
FIG. 12A  FIG. 12B
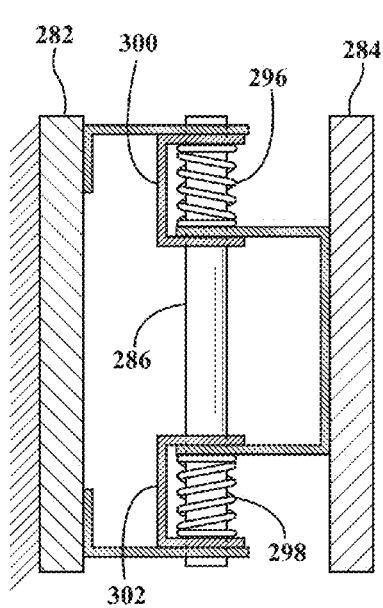
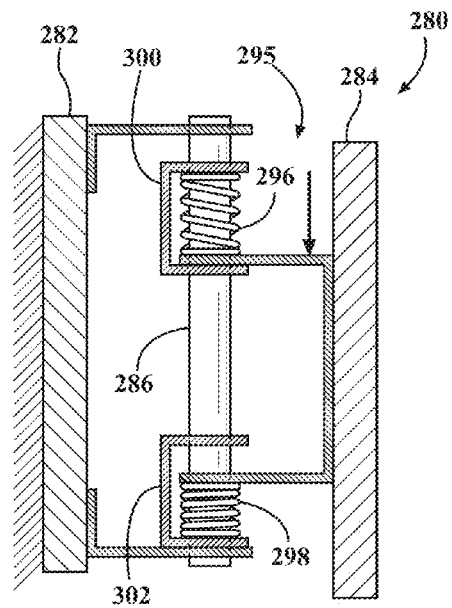
FIG. 13A  FIG. 13B

ROBOTICALLY OPERATED VEHICLE CHARGING STATION

CROSS REFERENCE TO RELATED APPLICATIONS

This application claims the benefit of U.S. Provisional Application Nos. 61/539,241 and 61/539,249, both filed Sep. 26, 2011, which are hereby incorporated by reference in their entirety.

TECHNICAL FIELD

The present invention relates generally to a robotically operated vehicle charging station for an electric or extended-range electric vehicle.

BACKGROUND

Various types of automotive vehicles, such as electric vehicles (EVs), extended-range electric vehicles (EREVs), and hybrid electric vehicles (HEVs) are equipped with an energy storage system that requires periodic charging. Typically, this energy storage system may be charged by connecting it to a power source, such as an AC supply line. While it may be advantageous to re-charge the vehicle's energy storage system before or after each vehicle use, current systems require the vehicle operator to manually plug the supply line into the vehicle. Such manual operation may not always be convenient for the vehicle operator, which may result in missed charging instances and/or subsequently degraded vehicle performance.

SUMMARY

A robotic charging station for charging a battery of an electric vehicle includes a base plate, a riser, and a robotic arm. The riser is coupled with the base plate and extends substantially transverse to the base plate. The robotic arm extends from the riser and supports an end effector, where the robotic arm is configured to move the end effector in three degrees of motion. The end effector includes a plurality of electrical contacts configured to couple with a receptacle disposed on the electric vehicle.

In one configuration, the base plate includes a first end and a second end, where the riser is coupled with the base plate proximate to the first end, and a tire trap being disposed proximate to the second end. The station may further include a presence sensor configured to detect the presence of the electric vehicle, and a controller configured to selectively control the motion of the robotic arm.

The robotic arm may include a target tracking camera configured to provide visual feedback to the controller, wherein the controller is configured to use the visual feedback to guide the movement of the robotic arm.

The end effector may include a base plate configured to attach with the robotic arm, and a retractable guide surrounding the plurality of electrical contacts. The retractable guide may selectively transition between an extended state and a collapsed state, wherein the retractable guide is configured to align the end effector with the receptacle when in an extended state. The end effector may further include a plurality of support legs extending between the retractable guide and the base plate. The plurality of support legs may be pivotable between a first position and a second position, with the legs configured to maintain the retractable guide in the extended state when in the first position. Additionally, the support legs may be configured to allow the retractable guide to transition to the collapsed state when pivoted to the second position.

The end effector may further include a force sensor disposed on the base plate and configured to be contacted by at least one of the plurality of support legs when the at least one of the plurality of support legs is in the first position. The force sensor may provide an indication of contact made between the retractable guide and the receptacle disposed on the vehicle.

The retractable guide may include an inward facing surface adjacent the plurality of electrical contacts, and may further include a chamfer disposed on the inward facing surface that is configured to align the end effector with the receptacle disposed on the vehicle.

The end effector may include a mechanical guide that extends from the base plate and surrounds the plurality of electrical contacts. In one configuration, the retractable guide may extend further outward from the base plate than the mechanical guide when the retractable guide is in an extended state.

The robotic charging station may further include a compliant mounting adaptor coupled with the base plate of the end effector and with the robotic arm to allow the base plate to pivot and to translate about an axis.

Similarly, a method of automatically charging a battery of an electric vehicle may include: detecting the presence of an electric vehicle; transitioning a robotic arm from a stowed position to an operational position, the robotic arm supporting an end effector configured to electrically couple with a receptacle disposed on the electric vehicle; guiding the end effector into a coupled engagement with the receptacle on the vehicle; and energizing the end effector.

BRIEF DESCRIPTION OF THE DRAWINGS

FIG. 2 is a schematic plan view of a robotic charging station for an electric vehicle with a robotic arm disposed in an operational state.

FIG. 3 is a schematic plan view of a robotic charging station for an electric vehicle with a robotic arm disposed in a retracted state.

FIG. 11 is a schematic side view of an embodiment of an end effector including force sensing means.

FIG. 12A is a schematic top view of a compliant mounting adapter for mounting the end effector to a handle, shown in an un-loaded condition.

FIG. 12B is a schematic top view of a compliant mounting adapter for mounting the end effector to a handle, shown with an applied force.

FIG. 13A is a schematic cross-sectional side view of the compliant mounting adapter provided in FIG. 12A, taken along line 13-13, shown in an un-loaded condition.

FIG. 13B is a schematic cross-sectional side view of the compliant mounting adapter provided in FIG. 12A, taken along line 13-13, shown with an applied force.

DETAILED DESCRIPTION

Figure 1:
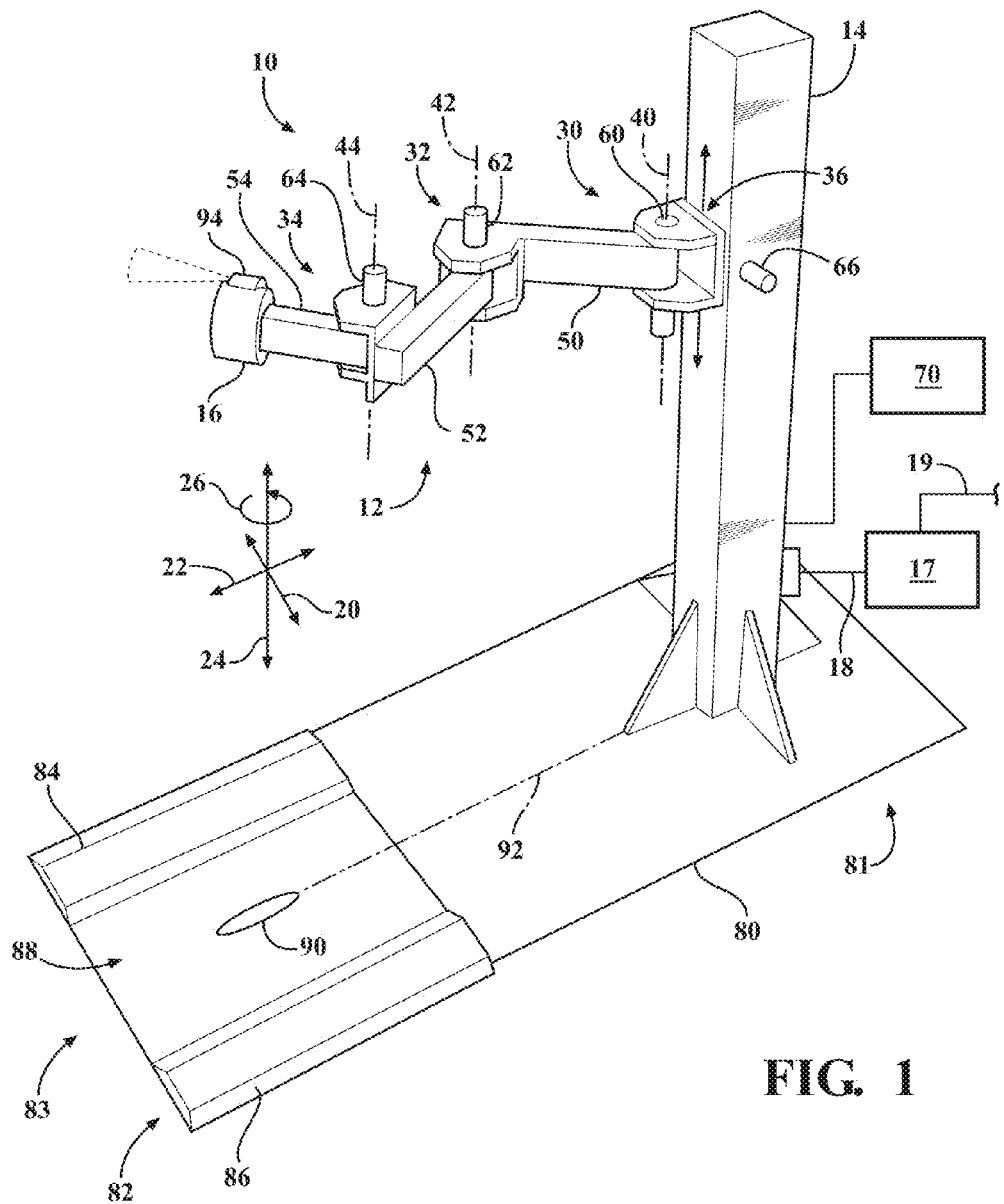
FIG. 1 is a schematic perspective view of a robotic charging station for an electric vehicle.

Referring to the drawings, wherein like reference numerals are used to identify like or identical components in the various views, FIG. 1 schematically illustrates a robotic charging station 10 for charging or re-charging the primary energy storage device for an electric vehicle. As used herein, an electric vehicle may encompass any vehicle that includes an electric motor as a source of power for vehicle propulsion. While an automobile will be used as the exemplary vehicle for the purpose of this description, other vehicles may similarly be used. Some examples of electric vehicles include, but are not limited to, electric-only electric vehicles (EVs), plug-in hybrid electric vehicles (PHEVs), extended range electric vehicles (EREVs). These vehicles may include passenger cars, cross-over vehicles, sports-utility vehicles, recreational vehicles, trucks, buses, commercial vehicles, etc.

An electric vehicle may operate by expending electrical energy from an energy storage device, such as a vehicle battery, to power the electric motor during a period of propulsion. After a prolonged period of energy depletion, the vehicle battery may require re-charging before continued propulsion may resume. Such re-charging may occur by coupling the vehicle battery to a source of electrical power either directly, or through one or more intermediate components.

The robotic charging station 10 may be a stationary apparatus that may be disposed at the vehicle operator's residence (i.e., in the operator's garage or car-port), at the operator's place of work, or at a commercial charging location. The charging station 10 may include a movable, robotic arm 12 coupled with a riser 14, where the arm 12 is configured to automatically couple an end effector 16 to a mating plug/receptacle 102 on the vehicle 100 to charge the vehicle's battery 104 (generally illustrated in FIG. 2). As will be described in greater detail below, the end effector 16 may include a specially configured plug with a plurality of electrical contacts designed to couple with similar contacts on the vehicle. The contacts may be selectively energizable to deliver electrical energy from a charging unit 17 to the vehicle and/or vehicle battery.

Figure 5:
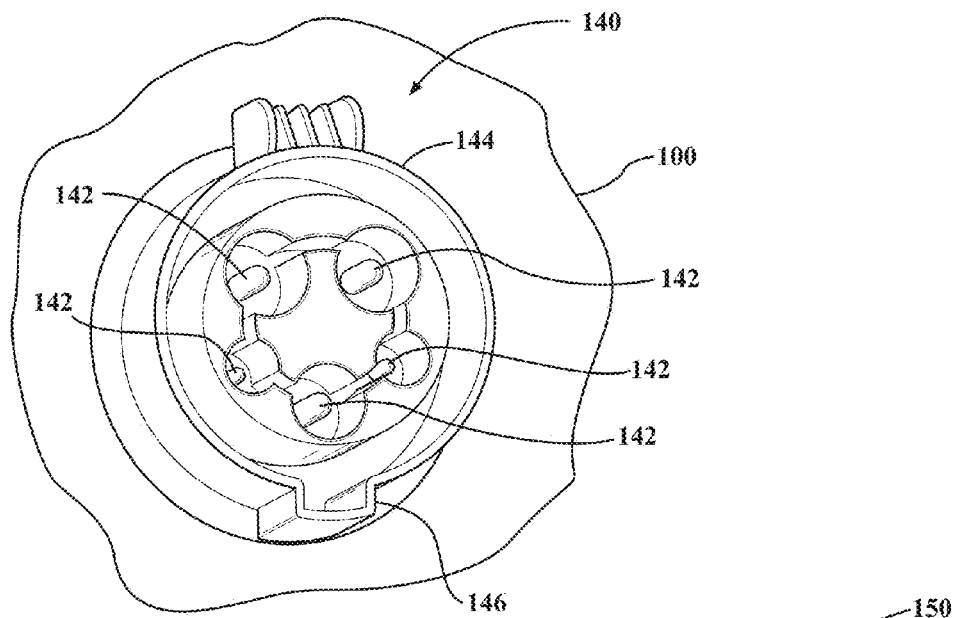
FIG. 5 is a schematic perspective view of a charging receptacle, such as may be disposed on an electric vehicle.

The charging unit 17 may be either integrated into the riser 14, or may be separately connected to the charging station 10 via a pluggable power line 18. Additionally, the charging unit may be coupled to an external power supply (e.g., grid power, roof mounted solar cells, etc.) via a source line 19. The charging unit 17 may be configured to supply either direct current (DC) electrical power, or alternating current (AC) electrical power, where the supplied power may comprise one or more distinct voltages/phases. Depending on the nature of the external power supply, the charging unit 17, along with the power capabilities of the vehicle, the charging unit 17 may include an inverter/converter to provide the vehicle with the properly conditioned, rectified, and/or filtered AC or DC power supply. In a configuration where the charging unit 17 is a standard, wall-mounted charging unit, the charging station 10 may include a receptacle (such as generally illustrated in FIG. 5) that may receive the pluggable power line 18 and provide any received electrical energy to the end-effector 16.

In one embodiment, the robotic arm 12 may be capable of moving the end effector 16 with four degrees of motion. For example, as shown in FIGS. 1-2, the end effector 32 may move along the vehicle (X direction 20), across the vehicle (Y direction 22), in a vertical Z direction 24, and may have a degree of rotation about the vertical axis/direction (θZ rotation 26). In another embodiment, the robotic arm 12 may be configured to only move the end effector 16 with three degrees of motion, namely X, Y, and θZ (i.e., directions 120, 122, and 126). In this embodiment, the vertical, Z translation may be fixed and/or accommodated by an inherent or designed compliance of the robotic arm 12. While it is possible for the robotic arm 12 to have more or fewer degrees of motion depending on the specific application, in an automotive charging application, independent rotation control about the X or Y axes may not be strictly necessary. That is, only minor rotations of the vehicle should be expected to occur in the θX or θY directions, such as may be attributable to fluctuations in tire pressure and/or varying weight distribution. These minor variations may be accommodated through inherent or designed compliance of the arm 12 and/or end effector 16.

To control the end effector 16 in the three or four degrees of motion described above (i.e., motion along directions 20, 22, 24, 26), the robotic arm 12 may configured to manipulate a plurality of joints, each controllable in one or more degrees of freedom. As generally illustrated in FIG. 1, in one configuration, the arm 12 may include three revolute joints (i.e., revolute joints 30, 32, 34) and one translational joint 36. Each revolute joint 30, 32, 34 may allow a portion of the arm 12 to rotate about a respective axis 40, 42, 44. In one configuration, the three respective axes 40, 42, 44 may be in a parallel arrangement with each other, though may be separated in space. As shown, the first and second joint axes 40, 42 may be separated and held in rigid alignment relative to each other via a first arm member 50. Similarly, the second and third joint axes 42, 44 may be separated and held in rigid alignment relative to each other via a second arm member 52. Finally, the end effector 16 may be mounted to a third arm member 54 that may be configured to rotate about the third joint axis 44.

As illustrated in FIG. 1, when the system is configured with four degrees of motion, the three arm members 50, 52, 54 may jointly translate along the riser 14 via the translational joint 36, which may be located at the base of the arm 12. The translational joint 36 may include for example, a linear slide, a linear actuator, an actuated timing cable or pulley system, a hydraulic or pneumatic ram/cylinder, a rack and pinion, or any other suitable means of linear translation.

The motion of the arm 12 at each joint 30, 32, 34, 36 may be controlled by a respective joint actuator 60, 62, 64, 66, which may be selectively actuated at the direction of a controller 70. The actuators 60, 62, 64 coupled with the revolute joints 30, 32, 34 may be, for example, servomotors that may convert an electrical signal into a controlled mechanical rotation. In one configuration, the actuators 60, 62, 64 may be coupled with the joints either directly (as shown) or through one or more torque-multiplying gear trains (e.g. a planetary gear systems). In an alternate configuration, each actuator 60, 62, 64 may be positioned at or within the riser 14, and coupled to each respective joint 30, 32, 34 through one or more links, pulleys, and/or cables that are capable of transferring the mechanical output of the actuators 60, 62, 64 to the respectively coupled joints 30, 32, 34. In this manner, the motion of the end effector 16 may be controlled in the four degrees of motion (X, Y, Z, θZ) by manipulating each joint 30, 32, 34, 36 as generally represented in Equation 1, where T is a transformation matrix and ($\Phi_1$, $\Phi_2$, $\Phi_3$, $\Phi_T$) represent the joint variables (i.e., three controllable rotations, and one controllable translation).

$$\begin{bmatrix} X \\ Y \\ Z \\ \theta Z \end{bmatrix} = T \begin{bmatrix} \phi_1 \\ \phi_2 \\ \phi_3 \\ \phi_T \end{bmatrix} \quad \text{Equation 1}$$

The controller 70 used to execute the control schemes and drive the various actuators may be embodied as a server, host, programmable logic controller (PLC), and/or may include one or multiple digital computers or data processing devices. Each included computer/processing device may have one or more microprocessors or central processing units (CPU), read only memory (ROM), random access memory (RAM), electrically-erasable programmable read only memory (EEPROM), high-speed clocks, analog-to-digital (A/D) circuitry, digital-to-analog (D/A) circuitry, and any required input/output (I/O) circuitry and devices, as well as signal conditioning and buffering electronics.

While shown as a single device in FIGS. 1-3, for simplicity and clarity the various elements of the controller 70 may be distributed over as many different hardware and software components as are required to optimally control the robotic arm 12. The individual control routines/systems resident in the controller 70 or readily accessible thereby may be stored in ROM or other suitable tangible memory location and/or memory device, and may be automatically executed by associated hardware components of the control system to provide the respective control functionality.

The riser 14 may be secured to a base plate 80 that may lie substantially flat on the ground. The base plate 80 may provide a stable foundation for the operation of the robotic charging station 10, and may inhibit the riser 14 from bending or twisting during the extension of the robotic arm 12. The base plate 80 may be constructed from a structural material, such as for example, iron, steel, or aluminum, which may resist bending or deforming away from the ground. In one configuration, the base plate 80 may be elongated with a first end 81 and a second end 82, where the riser 14 is secured proximate to the first end 81.

The base plate 80 may further include a tire trap 83 proximate to the second end 82, which may provide the vehicle operator with an indication that the vehicle is properly positioned relative to the riser 14 for the arm 12 to properly couple with the vehicle. The tire trap 83 may include for example, a first raised portion 84 and a second raised portion 86 that are spaced apart and define a valley 88 therebetween. A wheel of the vehicle may encounter and roll over the first raised portion 84, where the vertical translation of the wheel may be transmitted to the vehicle such that it can be detected by the operator to convey a sense of location to the vehicle operator. Upon sensing this motion, the operator may stop the vehicle's forward motion prior to the vehicle driving over the second raised portion 86 (which may be larger than the first raised portion 84 to provide increased resistance). As such, the wheel may come to rest in the valley 88 between the first and second raised portions 84, 86 of the tire trap 83.

In one configuration, a presence sensor 90 may be disposed in the valley 88 of the tire trap 83 and configured to detect the presence of the tire/vehicle. For example, in one embodiment, the presence sensor 90 may be a force sensor (e.g., force-sensing resistor) configured to monitor for an applied pressure. Once the presence sensor 90 detects an applied load, i.e., a load comparable to that of a vehicle, it may provide a corresponding indication to the controller 70 (via signal line 92). In other embodiments, the presence sensor 90 may use optical, acoustic, or RFID based sensing means to detect the presence of the vehicle. In still other embodiments, the vehicle presence sensor 90 may be placed on a portion of the arm 12 or riser 14 and configured to visually detect the presence of the vehicle.

The arm 12 may include a target tracking camera 94 either disposed near the end effector 16, or integrated into the end effector 16. Once the presence sensor 90 detects the presence of the vehicle 100 (generally shown in FIG. 2), the robotic arm 12 may begin moving the end effector 16 toward the vehicle 100 by manipulating the various joint actuators 60, 62, 64, 66. In one configuration, the initial arm movement may be pre-planned, where, after a certain threshold, the controller 70 may receive feedback from the target tracking camera 94. The camera feedback may comprise a periodically captured still image of the vehicle 100 that may be used to direct future movements of the arm 12 toward the vehicle charging plug/receptacle 102 in a closed loop manner. The controller 70 may analyze each still image to detect and quantify certain known/designed patterns on the vehicle 100 to infer a spatial relationship. The controller 70 may then use this inferred spatial relationship as feedback to carefully guide the end effector 16 toward the receptacle 102. For example, the size of the pattern within the captured still image may generally indicate the distance of the end effector 16 from the vehicle 100 (i.e., the Y direction 22). Alternatively, multiple target tracking cameras may be included with the arm 12 in a spaced arrangement to provide a stereoscopic perspective/view of the vehicle 100 and/or charging receptacle 102. Likewise, the skew of the pattern, or the position of the pattern within the image (or various images) may generally inform movements in the X direction 20, the Z direction 24, or the OZ rotation 26.

In other configurations, target tracking cameras, similar to camera 94, may be included with the riser 14 and/or base plate 80. While such cameras may be used specifically for end-effector 16 guidance purposes, as described above, they may also more generally be used to detect the general presence/orientation/positioning of the vehicle 100 and/or may provide obstacle avoidance capabilities for the end effector and/or various portions of the arm 12.

While FIG. 2 illustrates the robotic arm 12 in an operational position (i.e., deploying to engage and couple with the vehicle 100 to charge the vehicle battery 104), FIG. 3 illustrates the arm 12 in a stowed position. As shown, the arm 12 may fold upon itself adjacent to the riser 14 such that it does not unnecessarily protrude away from the riser 14. This may reduce the likelihood that the arm 12 may be impacted by objects from the surrounding environment, which could cause damage to the end effector 16, arm 12, riser 14, or any other associated components. This collapsed position also provides the vehicle 100 with clear ingress/egress paths.

Figure 4:
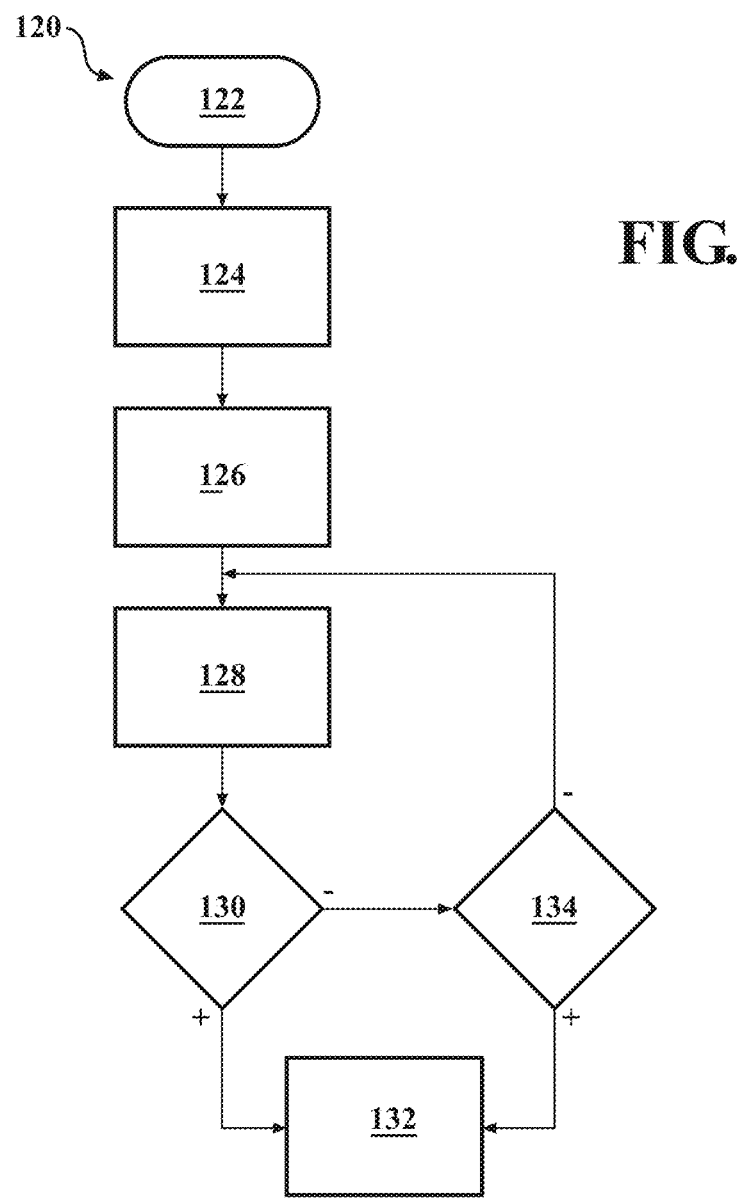
FIG. 4 is a flow diagram of a method for charging an electric vehicle using a robotic charging station.

FIG. 4 illustrates an example of a charging method 120 utilizing the robotic charging station 10. The method begins at step 122 when the vehicle presence sensor 90 detects the presence of the vehicle 100, and indicates to the controller 70 that the vehicle is stationary next to the riser 14. In step 124, the controller may transition the robotic arm 12 from a stowed position to an operational position (i.e., a "ready" position where the arm may more directly translate toward the vehicle 100). This transition may involve orienting the end effector 16 and any associated target tracking camera 94 to point toward the vehicle 100 such that the electric plug/receptacle on the vehicle is within the view of the camera 94.

Once the robotic arm 12 is in an operational position, in step 126 the controller 70 may use a suitable control scheme, including visual/target tracking feedback from the target tracking camera 94 to guide the end effector 16 into a coupled engagement with the mating plug/receptacle on the vehicle 100. The coupled arrangement necessarily includes establishing electrical contact between the end effector 16 and the vehicle 100. Once this electrical contact is established, the end effector 16 may be energized (in step 128) to begin the charging/re-charging of the vehicle's energy source/battery. Such charging may be initiated by the vehicle 100, by the charging station 10, or by an ancillary wall unit. Additionally, conditioning/reconditioning procedures may be performed on the vehicle battery 104 in step 128. During the charging process, the charging station 10 and/or vehicle 100 may monitor the state of charge (SoC) of the vehicle battery and/or the progress through a reconditioning procedure in step 130. If the SoC rises above a predefined charging threshold, or the reconditioning procedure reaches completion, the station 10 may de-energize the end effector 16, and retract it back to a stowed position in step 132. As used herein, the SoC is a measure of the energy stored in the battery, and is typically expressed as a percent of total battery capacity. The SoC may be measured/determined by either the vehicle 100 or by the charging station 10 using methods known in the art or hereinafter developed.

If it is determined that the SoC is below the ultimate charging threshold (i.e., the battery is not "full") (in step 130), the controller 70 may further examine whether a manual stop has been requested by the vehicle 100 or by a user in step 134. If a manual stop is requested, then the method proceeds to step 132, where the end effector 16 de-energizes and retracts. If a manual stop has not been requested, the method 120 continues charging the vehicle battery (step 128) until either the target SoC is reached or a stop is eventually requested.

Furthermore, prior to charging, the robotic arm 12 may be configured to open a receptacle door that may conceal the charging receptacle 102. In one configuration, this action may include transmitting a signal to the vehicle to automatically open the door. In another configuration it may involve pushing on the door to release a lock, followed by a retraction/articulating motion to fully open the door. The grasping may be accomplished using any suitable selective coupling effector, such as for example, suction devices, hooks, and/or latches. Following the completion of a charging routine, the robotic arm 12 may be configured to close the receptacle door in a similar manner.

FIG. 5 illustrates an example of a vehicle charging plug/receptacle 140, which may be similar to plug/receptacle 102, included with a vehicle 100, as illustrated in FIG. 2. As shown, the receptacle 140 may include a plurality of electrical contacts 142 and a mechanical guide 144 to aid in the proper alignment/coupling between the end effector 16 and the receptacle 140. The mechanical guide 144, for example, may encircle the plurality of electrical contacts 142, and may have one or more locating features 146 to promote proper axial alignment.

Figure 6:
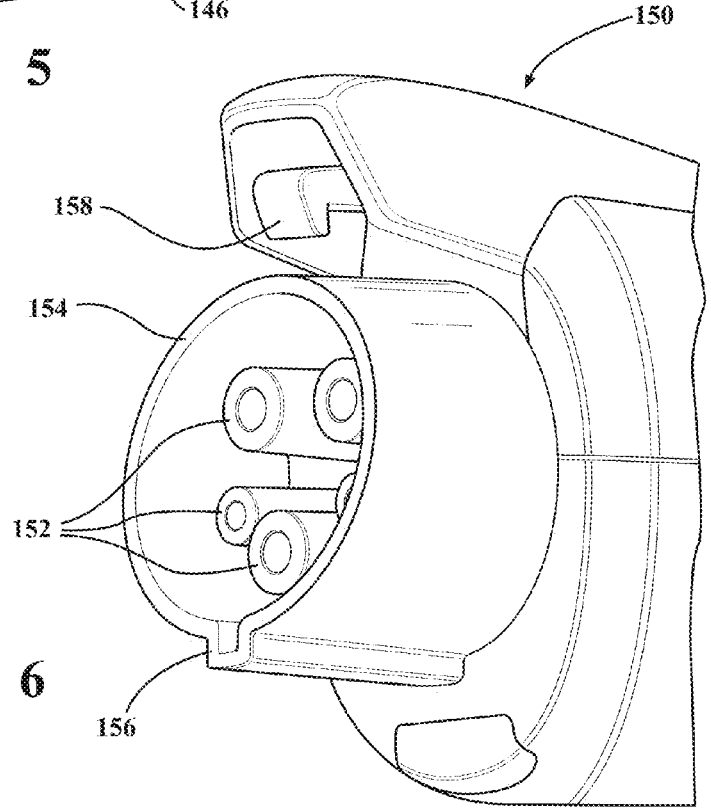
FIG. 6 is a schematic perspective view of an embodiment of an end effector for a robotic charging station.

FIG. 6 illustrates an end effector 150 that may be similar to the end effector 16 described above, and may be used to couple with the vehicle charging receptacle 140 of FIG. 5. As shown, the end effector 150 may include a plurality of electrical contacts 152 that are each configured to mate with a respective electrical contact 142 of the receptacle 140. The end effector 150 may further include a mechanical guide 154 that is adapted to fit within or over the mechanical guide 144 of the receptacle 140. A locating feature 156 of the end effector 150 may mate/engage with a similar locating feature 146 of the receptacle 140 to aid in providing proper alignment/orientation. As illustrated in FIGS. 5-6, the locating feature 156 may be a keyed portion of the mechanical guide 152 that may prevent the end effector from being coupled with the receptacle in any manner except the proper orientation. The end effector 150 may further include a selectively engagable retaining clip 158 that may couple the end effector 150 to the receptacle 140. The clip 158 may both ensure proper interconnection/coupling (i.e., ensure that the end effector 150 is properly seated against the receptacle 140), and reduce the likelihood that a slight, inadvertent bump to the arm 12 or vehicle 100 may de-seat the end effector 150.

Figure 7:
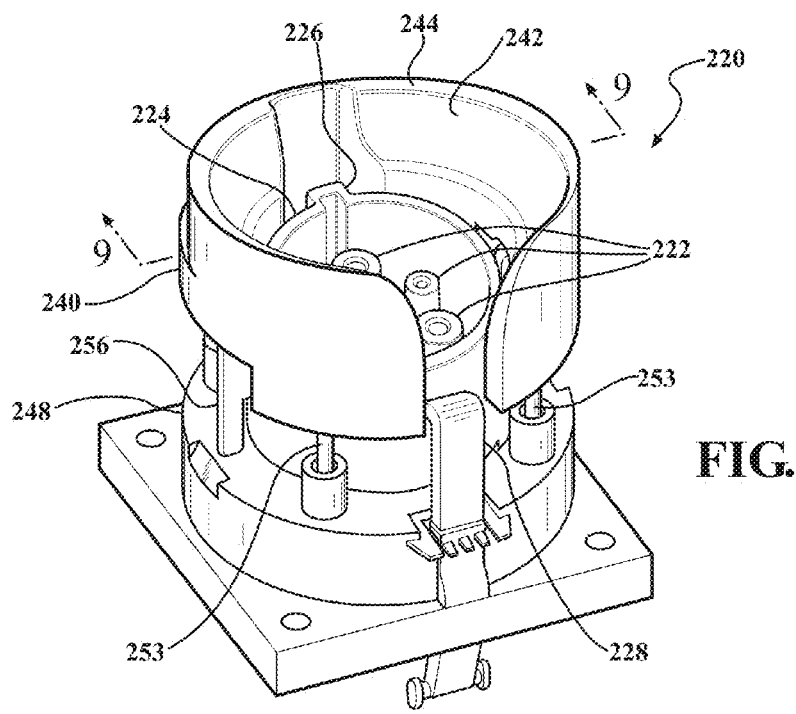
FIG. 7 is a schematic perspective view of an embodiment of an end effector for coupling with an electric vehicle.
Figure 8:
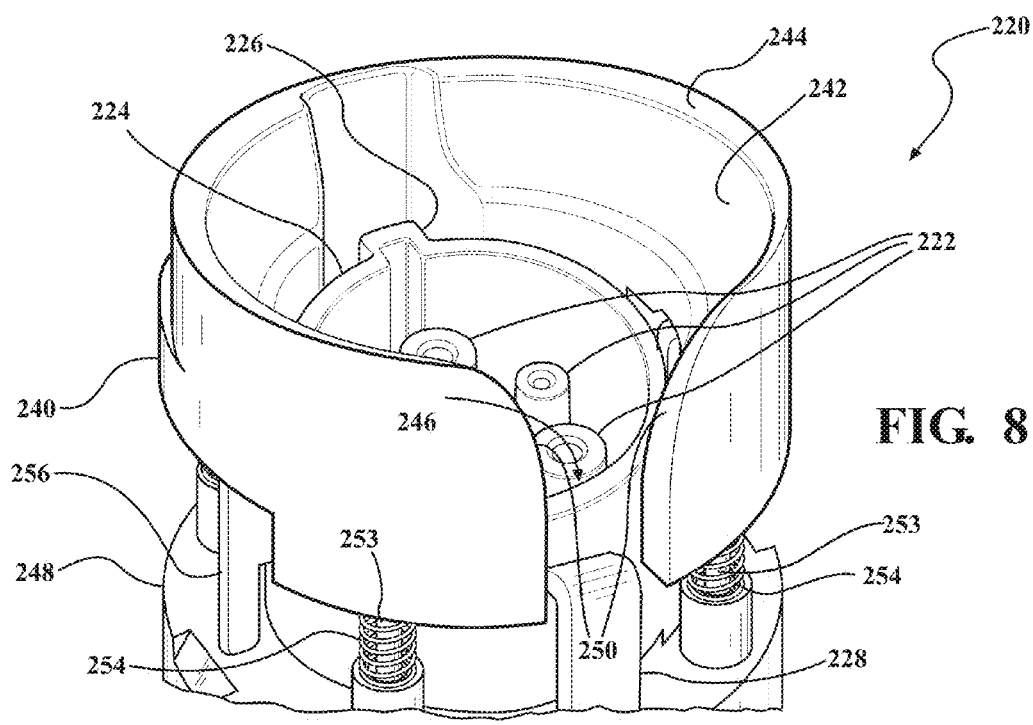
FIG. 8 is an enlarged schematic perspective view of a portion of the end effector provided in FIG. 7.

FIG. 7 illustrates another embodiment of an end effector 220 that may be similar to the end effector 16 described above, and may be used to selectively couple with the charging receptacle 140 of the vehicle 10. As shown, the end effector 220 may include a plurality of electrical contacts 222 that are each configured to mate with a respective electrical contact 142 of the receptacle 140.

The end effector 220 may include a mechanical guide 224 configured to generally surround the electrical contacts 222 and adapted to fit within or over the mechanical guide 144 of the receptacle 140. The mechanical guide 224 may include a locating feature 226 configured to mate/engage with a similar feature 146 of the receptacle 140 to aid proper alignment/orientation. As illustrated in FIGS. 5-7, the locating feature 226 may be a keyed portion of the mechanical guide 224 that may prevent the end effector 220 from being coupled with the receptacle 140 in any manner except in the proper orientation. The end effector 220 may further include a selectively engagable retaining clip 228 that may interlock with a protrusion provided on the receptacle 140. The retaining clip 228 may ensure proper electrical interconnection/coupling is established and maintained throughout the charging process (i.e., ensure that the end effector 220 is properly seated against the receptacle 140). In this manner, the clip 228 may reduce the likelihood that a slight, inadvertent bump to the connector/effector 220 or vehicle 100 may de-seat the end effector 220.

As generally illustrated in FIGS. 7-10, the end effector 220 may further include a retractable guide 240 that generally surrounds, or extends from the stationary mechanical guide 224, and may be adapted to further aid in aligning and orienting the connector/effector 220 with the receptacle 140. The retractable guide 240 may, for example, include an inward-facing chamfer 242 that generally extends from the leading edge 244. The chamfer 242 may be operative to funnel/translate a misaligned connector/effector 220 onto the receptacle 140. Additionally, the retractable guide 240 may include or define a slotted opening 246, which may extend from the leading edge 244 of the guide 240 toward the retaining clip 228. The slotted opening 246 may allow the protrusion of the receptacle 140 to pass unimpeded toward the base 248 of the connector/effector 220, where it may be engaged by the clip 228. The retractable guide 240 may include a secondary chamfer 250 on either side of the slotted opening 246 to funnel the protrusion toward the clip 228. In doing so, the secondary chamfer 250 may correct minor axial orientation differences between the receptacle 140 and the connector/effector 220.

Figure 9:
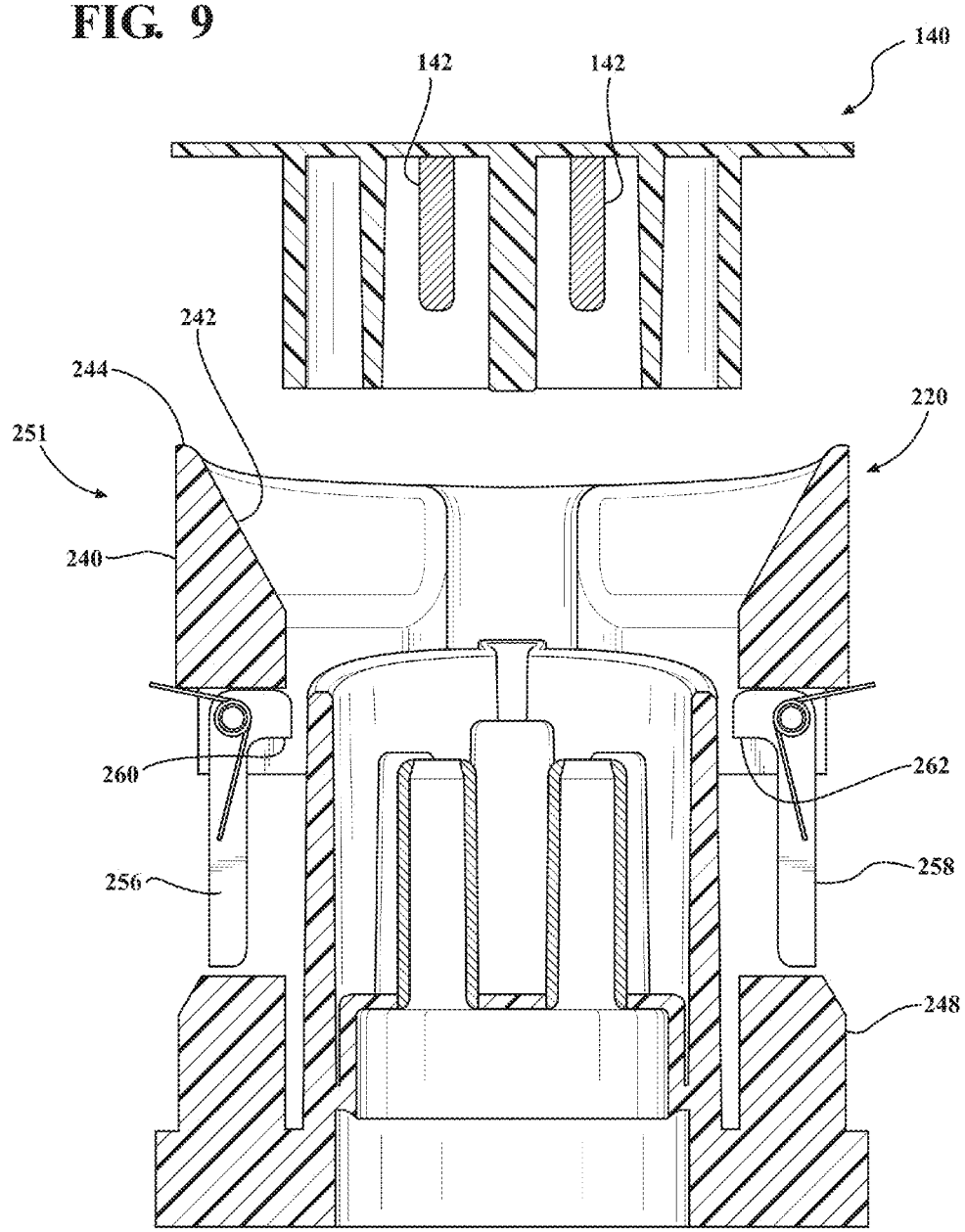
FIG. 9 is a schematic partially exploded crossectional view of the end effector provided in FIG. 7, taken along line 9-9, shown with the retractable guide in an extended state.
Figure 10:
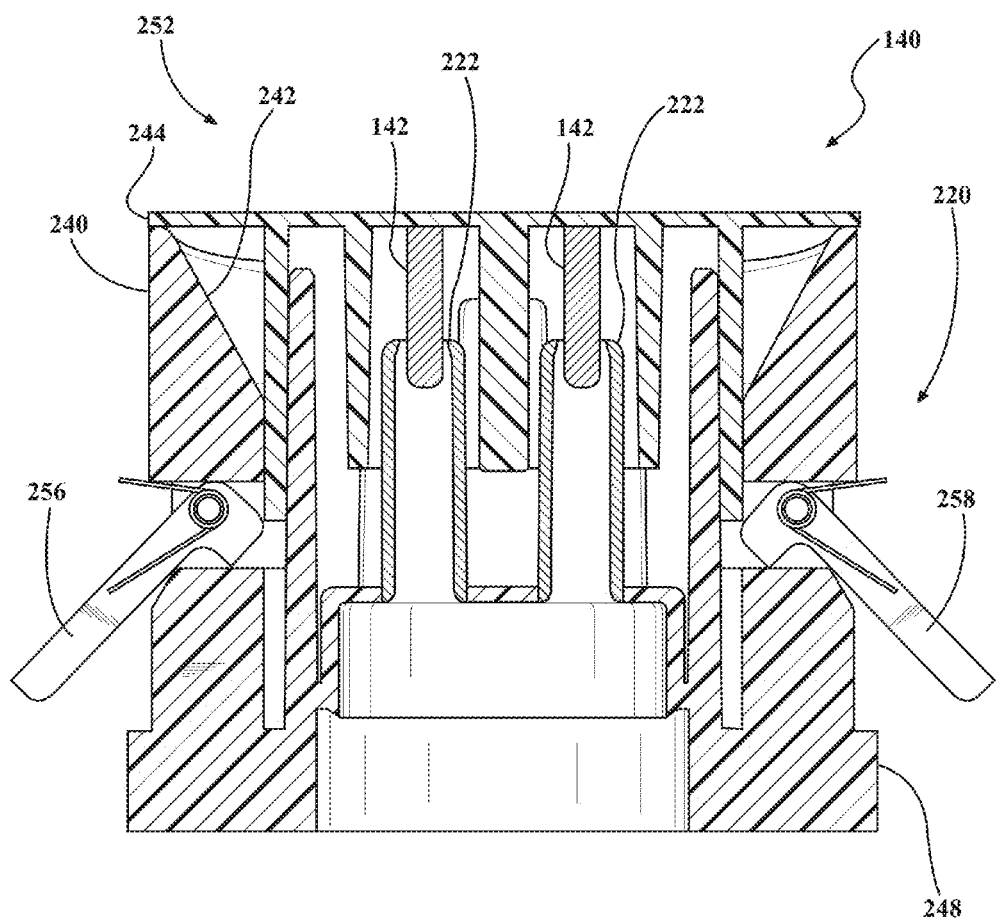
FIG. 10 is a schematic crossectional view of an end effector, such as provided in FIG. 7, taken along line 9-9, shown with the retractable guide in a collapsed state.

As generally illustrated in FIGS. 9-10, the retractable guide may transition between an extended state 251, as generally shown in FIG. 9, and a collapsed state 252, as generally illustrated in FIG. 10. When in an extended state 251, the retractable guide 240 may therefore be used to fine-tune the relative positions of the connector/effector 220 and receptacle 140 before the electrical contacts 142, 222 engage each other. In this manner, the respective electrical contacts 142, 222 may suitably interconnect without any jamming/buckling. Once the end effector 220 has been properly guided into a proper relative position vis-à-vis the receptacle 140, the retractable guide 240 may transition to a collapsed state 252 against the connector base 248 to allow the end effector 220 to more fully engage the receptacle 140 without obstruction.

In one configuration, the retractable guide 240 may ride along one or more guide posts 253, which may allow it to collapse against the base 248. A plurality of sufficiently stiff, pre-stressed springs 254 may be disposed about the guide posts 253 and may provide some resilience against the collapsing motion and/or may allow the retractable guide 240 to extend when the connector/effector 220 is removed from the receptacle 140. During the collapsing/retracting motion, the springs 254 may be compressed between the retractable guide 240 and the base 248 of the connector/effector 220. In one configuration, the springs 254 may maintain the retractable guide 240 in an extended state 251, and with sufficient resilience/support to permit the guide 240 to accomplish its guiding function prior to collapsing. Once the end effector 220 is properly aligned, the advancement of the connector/effector 220 may exert a sufficiently strong force against the retractable guide 240 to counteract the load exerted by the springs, and may cause the springs to elastically compress.

In another configuration, as generally illustrated in FIGS. 7-11, the retractable guide 240 may be supported and/or locked in an extended position 251 using support legs 256, 258 that may remain in place until actively released (as shown in FIG. 10). In an embodiment, the legs 256, 258 may be pivotably connected with the retractable guide 240. The support legs 256, 258 may be pivotable between a first position (illustrated in FIG. 9) and a second position (illustrated in FIG. 10). The support legs 256, 258 may be configured to maintain the retractable guide 240 in the extended state 251 when in the first position, and configured to allow the retractable guide 240 to transition to the collapsed state 252 when pivoted to the second position. More specifically, as generally illustrated in FIG. 9, the legs 256, 258 may ordinarily extend between the retractable guide 240 and the base 248, and may prevent the retractable guide 240 from collapsing/retracting along the guide posts 253. Once the end effector 220 slides onto the receptacle 140, the receptacle 140 may contact a protrusion 260, 262 extending from each respective leg 256, 258 and cause the legs 256, 258 to pivot outward. Once pivoted out of a supporting position, the retractable guide 240 may collapse against the base portion 248.

As generally illustrated in FIG. 11, one or more force sensors 270, 272 may be included on the base 248 adjacent to each pivoting leg (e.g., leg 256). A portion of the leg 256 (or an extension thereof) may be configured to contact the force sensors 270, 272 when the leg is disposed in a supporting position between the base 248 and the guide 240. In this manner, the force sensors 270, 272 may provide an indication of the contact forces applied to the retractable guide 240 to a supervising electrical controller. This feedback may be used to estimate the approximate magnitude and direction of any contact made with the retractable guide 240 or to indicate that the guide has suitably retracted and a mechanical coupling has been achieved. For example, if the retractable guide 240 is contacted off-center by the receptacle 140, the load may then be transmitted to one or more of the respective force sensors 270, 272. This feedback may be useful in determining whether the end effector 220 has been sufficiently advanced onto the receptacle 140 to cause the guide 240 to retract and establish a secure coupling. Alternatively, in a robotic context, the contact-sensitive feedback may be used to more precisely control the final approach and interconnection. In one embodiment, the force sensors 270, 272 may be force sensitive resistors that have a variable resistance depending on the amount of applied force.

FIGS. 12A-12B and FIGS. 13A-13B schematically illustrate an embodiment of a compliant mounting adaptor 280 that may be used to join the end effector 220 with a handle or robotic arm. As illustrated, the compliant mounting adaptor 280 may include a first mounting plate 282 and a second mounting plate 284 coupled in a selectively pivotable arrangement. FIGS. 12A-12B schematically illustrate, for example, a top view of the mounting adaptor 280, whereas FIGS. 13A-13B schematically illustrate a cross-sectional side view, taken along line 13-13 of FIG. 12A.

In one configuration, the first mounting plate 282 may be coupled with a handle or robotic arm that may be used to guide the end effector 220 into contact with the receptacle 140. Likewise, the second mounting plate 284 may be coupled to the base portion 248 of the end effector 220. As illustrated in FIG. 12A-12B, the first and second mounting plates 282, 284 may be connected to each other and allowed to rotate about a pivot 286. A first and second compressible post 288, 290 may be disposed between the first and second mounting plates 282, 284 on opposing sides of the pivot 286. Each of the first and second compressible post 288, 290 may respectively include a pre-loaded spring 292, 294 that may allow the post to compress only after the pre-loaded force is counteracted by a force applied through the mounting plate 284 (as generally illustrated in FIG. 12B). In this manner, the plates 282, 284 may be pivotably stable until a threshold load is received.

FIGS. 13A-13B illustrate a translational compliant mechanism 295 that may be incorporated into the compliant mounting adaptor 280. As shown, the mechanism 295 may include first and second pre-loaded springs 296, 298 respectively disposed within retaining clips 300, 302, and translatable along the pivot 286. Each retaining clip 300, 302 may be disposed on an opposing side of a brace extending from the second mounting plate 284 such that motion of the second mounting plate 284 along the pivot 286 may compress one of the pre-loaded springs 296, 298. Similar to the pivotable compliance described above with respect to FIGS. 12A-12B, the second mounting plate 284 may be translationally stable until a threshold load is received that exceeds the pre-loaded spring force (as generally illustrated in FIG. 13B). In another configuration, rather than being integrated as a single device, the compliant devices provided in FIGS. 12A-12B and in FIGS. 13A-13B may be separate mechanisms, coupled to each other in a series arrangement between the handle and the end effector 220.

The compliant mounting adaptor 280 may include one or more force sensors and/or potentiometers that may be suitably configured to monitor the forces applied through the adaptor 280 and/or the pivoting or translational motion of the adaptor 280. Similar to the force sensors 270, 272 described above, the sensors associated with the compliant adaptor 280 may provide an indication of misaligned contact with the end effector 220 and/or retractable guide 280.

A second compliant mounting adaptor (similar to compliant mounting adaptor 280) may be coupled or integrated with the first compliant mounting adaptor 280, though may be rotated 90 degrees. Such a configuration may allow the end effector 220 to pivot about two axes, as well as translate along two axes.

As generally described above, the electrical end effector 220 may be integrated into a handle, or compliantly coupled to a handle via the mounting adaptor 280. Such a handle may include any necessary electronics and/or electrical connections to supply electrical power during a charging procedure. During such a procedure, a user may grasp the handle and advance the end effector 220 towards, for example, a vehicle's charging receptacle 140. As the connector/effector 220 physically engages the receptacle 140, the retractable guide 240 may refine the alignment/orientation so that the electrical contacts 222 of the connector/effector 220 properly mate with the connections 142 of the receptacle While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A robotic charging station for charging a battery of an electric vehicle, the charging station comprising:
    a base plate;
    a riser coupled with the base plate and extending substantially transverse to the baseplate;
    a robotic arm extending from the riser and supporting an end effector, the robotic arm configured to move the end effector in three degrees of motion;
    a target tracking camera integrated into the end effector and configured to periodically output a captured image;
    a controller configured to:
        receive the captured image from the target tracking camera;
        identify a pattern on the electric vehicle from the received captured image;
        determine a spatial relationship between the end effector and an electrical receptacle disposed on the electric vehicle from at least one of a size, a skew, or a position of the pattern within the captured image, wherein the end effector includes a plurality of electrical contacts configured to couple with the electrical receptacle; and
        control the motion of the robotic arm using the determined spatial relationship to move the end effector into electrical contact with the electrical receptacle;
    the end effector includes a base plate configured to attach with the robotic arm, and a retractable guide surrounding the plurality of electrical contacts and configured to transition between an extended state and a collapsed state, the retractable guide configured to align the end effector with the receptacle when in an extended state;
    the end effector further includes a plurality of support legs extending between the retractable guide and the base plate, the plurality of support legs being pivotable between a first position and a second position, the support legs configured to maintain the retractable guide in the extended state when in the first position, and configured to allow the retractable guide to transition to the collapsed state when pivoted to the second position;
    wherein the electrical receptacle includes a mechanical guide encircling a plurality of electrical contacts; and wherein contact between the mechanical guide and the plurality of support legs is operative to pivot each of the plurality of support legs from the first position to the second position;
    the retractable guide includes an inward facing surface adjacent the plurality of electrical contacts; and wherein the retractable guide further includes a chamfer disposed on the inward facing surface and configured to align the end effector with the receptacle disposed on the vehicle; and
    a compliant mounting adaptor coupled with the base plate of the end effector, the compliant mounting adaptor configured to allow the base plate to move about an axis.

2. The robotic charging station of claim 1, wherein the base plate includes a first end and a second end, the riser being coupled with the base plate at the first end, and a tire trap being disposed at the second end.

3. The robotic charging station of claim 1, further comprising a presence sensor configured to detect the presence of the electric vehicle.

4. The robotic charging station of claim 1, wherein the three degrees of motion include a motion substantially oriented across the vehicle, a motion substantially along the vehicle, and a rotation about a substantially vertical axis.

5. The robotic charging station of claim 4, wherein the robotic arm is configured to move the end effector in a fourth degree of motion, the fourth degree of motion including a motion substantially along the vertical axis.

6. The robotic charging station of claim 1, wherein the end effector further includes a force sensor disposed on the base plate and configured to be contacted by at least one of the plurality of support legs when the at least one of the plurality of support legs is in the first position; and
    wherein the force sensor is configured to provide an indication of contact made between the retractable guide and the receptacle disposed on the vehicle.

7. The robotic charging station of Regarding claim 1, wherein the end effector further includes a mechanical guide extending from the base plate and surrounding the plurality of electrical contacts; and
    wherein the retractable guide extends further outward from the base plate than the mechanical guide when the retractable guide is in an extended state.

8. The robotic charging station of claim 7, wherein the retractable guide extends a substantially similar distance outward from the base plate as the mechanical guide when the retractable guide is in a collapsed state.

9. The robotic charging station of claim 7, wherein the mechanical guide includes a locating feature configured to mate with a similar locating feature disposed on the charging receptacle.

* * * * *